United States Patent
Baek et al.

(10) Patent No.: US 9,583,747 B2
(45) Date of Patent: Feb. 28, 2017

(54) RETENTION ASSEMBLY FOR TRACTION BATTERY CELL ARRAY

(71) Applicant: Ford Global Technologies, LLC, Dearborn, MI (US)

(72) Inventors: Hyung Min Baek, Ann Arbor, MI (US); Patrick Daniel Maguire, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 14/592,324

(22) Filed: Jan. 8, 2015

(65) Prior Publication Data

US 2016/0204400 A1 Jul. 14, 2016

(51) Int. Cl.
*H01M 2/10* (2006.01)
*B60L 11/18* (2006.01)

(52) U.S. Cl.
CPC ....... *H01M 2/1077* (2013.01); *B60L 11/1879* (2013.01); *H01M 2/1094* (2013.01); *H01M 2220/20* (2013.01)

(58) Field of Classification Search
CPC .... H01M 2/0217; H01M 2/10; H01M 2/1016; H01M 2/1061; H01M 2/1077; H01M 2/1083; H01M 2/1094; H01M 10/0468; H01M 10/0481
See application file for complete search history.

(56) References Cited

U.S. PATENT DOCUMENTS

| 5,002,841 | A | * | 3/1991 | Belongia | H01M 2/025 429/152 |
|---|---|---|---|---|---|
| 6,275,003 | B1 | | 8/2001 | Marukawa et al. | |
| 2007/0052390 | A1 | * | 3/2007 | Kim | H01M 2/1016 320/116 |
| 2008/0280194 | A1 | | 11/2008 | Okada | |
| 2008/0305380 | A1 | * | 12/2008 | Andreas-Schott | H01M 8/248 429/460 |
| 2011/0151312 | A1 | * | 6/2011 | Kim | H01M 6/46 429/156 |
| 2011/0159336 | A1 | * | 6/2011 | Ohkura | H01M 2/1077 429/99 |
| 2011/0294030 | A1 | * | 12/2011 | Yamamoto | H01M 8/247 429/465 |
| 2012/0244397 | A1 | | 9/2012 | TenHouten et al. | |

(Continued)

FOREIGN PATENT DOCUMENTS

EP 0761984 A1 * 3/1997 ............ B25B 27/00
JP 2003323874 A * 11/2003

*Primary Examiner* — Carlos Barcena
(74) *Attorney, Agent, or Firm* — David B. Kelley; Brooks Kushman P.C.

(57) ABSTRACT

A traction battery assembly is provided. The traction battery assembly may include an array of battery cells, a pair of endplates, a strap, and an attachment fitting. Each of the pair of endplates may be disposed on opposite ends of the array and define edges and a receiving groove extending between the edges. The strap may be sized to sit within the groove and wrap around the array and endplates. The attachment fitting may connect ends of the strap such that the endplates compress the cells. The endplates may each further define the receiving groove at a mid-region of the endplates such that the strap wraps around the array at a substantially middle portion of outer faces defined by the array.

17 Claims, 5 Drawing Sheets

(56) References Cited

U.S. PATENT DOCUMENTS

| | | | |
|---|---|---|---|
| 2013/0171480 A1 | 7/2013 | Englert et al. | |
| 2013/0288105 A1* | 10/2013 | Niedzwiecki | H01M 2/1077 429/156 |
| 2014/0113171 A1* | 4/2014 | Schaefer | H01M 2/1077 429/120 |
| 2014/0212731 A1* | 7/2014 | Lim | H01M 2/1077 429/151 |
| 2015/0079451 A1* | 3/2015 | Jeong | H01M 2/1077 429/151 |

* cited by examiner

US 9,583,747 B2

RETENTION ASSEMBLY FOR TRACTION BATTERY CELL ARRAY

TECHNICAL FIELD

This disclosure relates to support structures for high voltage batteries utilized in vehicles.

BACKGROUND

Vehicles such as battery-electric vehicles (BEVs), plug-in hybrid-electric vehicles (PHEVs), mild hybrid-electric vehicles (MHEVs), or full hybrid-electric vehicles (FHEVs) contain an energy storage device, such as a high voltage (HV) battery, to act as a propulsion source for the vehicle. The HV battery may include components and systems to assist in managing vehicle performance and operations. The HV battery may also include one or more arrays of battery cells interconnected electrically between battery cell terminals and interconnector busbars. Structural support assemblies may assist in retaining components of the HV battery in various configurations. The HV battery and surrounding environment may include a thermal management system to assist in managing temperature of the HV battery components, systems, and individual battery cells.

SUMMARY

A traction battery assembly includes an array of battery cells, a pair of endplates, a strap, and an attachment fitting. Each of the pair of endplates is disposed on opposite ends of the array and defines edges and a receiving groove extending between the edges. The strap is sized to sit within the groove and wrap around the array and endplates. The attachment fitting connects ends of the strap such that the endplates compress the cells. Each of the ends of the strap may define a loop and the attachment fitting may include a carabiner. The carabiner may further include a body configured to extend through both loops to distal ends and a gate pivotally secured to one of the distal ends. The gate may be configured to engage the other of the distal ends. The attachment fitting may be of an aluminum alloy or aluminum core over-molded with a thermoplastic material. The strap may be of a non-conductive material to electrically isolate the battery cells. The receiving groove may be sized to receive at least a portion of a lift tool. The strap may be a polyester filament yarn woven into a single component. The endplates may each further define the receiving groove at a mid-region of the endplates such that the strap wraps around the array at a substantially middle portion of outer faces defined by the array. The strap may be of a material having a tensile load capability in excess of a predetermined expansion load of the cells. The attachment fitting and ends of the strap may be arranged with one another such that the fitting and ends self-engage and apply a tension to the strap when opposing compression loads are applied to the endplates.

An electrified vehicle includes an electric machine, an array of battery cells, a battery retention assembly, a strap, a pair of endplates, and an attachment fitting. The array of battery cells is configured to power the electric machine. The strap has first and second ends. Each of the pair of endplates is disposed on opposite ends of the cells. Each of the endplates defines a groove to receive a portion of the strap and to orient the portions such that the strap wraps around the array and endplates at a middle of the cells. The attachment fitting secures the first and second ends to one another such that the assembly applies a compression force to the cells and endplates. The attachment fitting, first end, and second end may be arranged with one another such that the fitting and ends self-engage and apply a tension to the strap when opposing compression loads are applied to the endplates. At least one of the ends may include connectors coated with a plastic resin via injection molding, structural reaction injection molding, or insert molding. The receiving groove may be sized to receive at least a portion of a lift tool. Each of the ends of the strap may define a loop. The attachment fitting may include a carabiner including a body configured to extend through both loops to distal ends and a gate pivotally secured to one of the distal ends and configured to engage the other of the distal ends.

A retention assembly for a vehicle traction battery includes first and second endplates, a first pair of opposing straps, and a second pair of opposing straps. The first and second endplates are spaced apart and each defines edges on both sides of an endplate face. Each of the first pair of opposing straps defines distal ends and extends toward one another from the first and second endplates. Each of the second pair of opposing straps defines distal ends and extends toward one another from the first and second endplates. The distal ends include a male or female connector configured to self-engage with the other connector of the pair when compression forces are applied to the endplates. The endplates further include female connectors integrated therewith, and wherein the pairs of opposing straps are configured to mate with the female connectors at portions of the straps opposite the distal ends. The pairs of opposing straps may be integrated with the endplates. Each of the endplates may further include ceramic or thermoset inserts disposed therein to reinforce portions of the endplates configured to receive loads from the first and second pairs of opposing straps. The pairs of opposing straps are of a non-conductive material to electrically isolate the battery cells. The first and second pairs of opposing straps may be baseball cap straps. The male connector may be a hook and the female connector may include an aperture sized to receive the hook.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
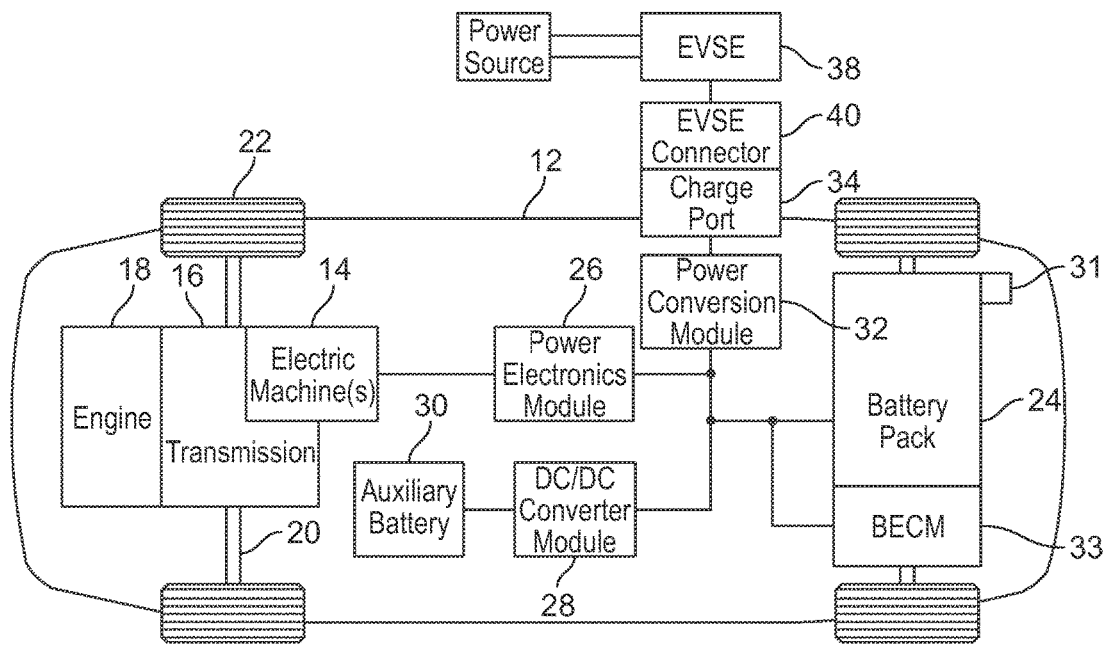
FIG. 1 is a schematic illustrating a battery electric vehicle.

FIG. 1 depicts a schematic of an example of a plug-in hybrid-electric vehicle (PHEV). A plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a PHEV, a FHEV, a MHEV, or a BEV in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells. The traction battery 24 may be heated and/or cooled using a liquid thermal management system, an air thermal management system, or other method as known in the art.

Figure 2:
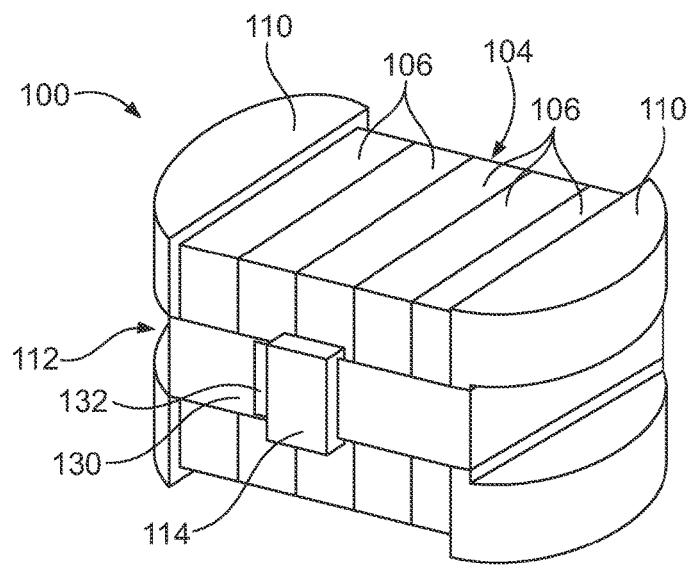
FIG. 2 is a perspective view of an example of a portion of a traction battery.
Figure 3A:
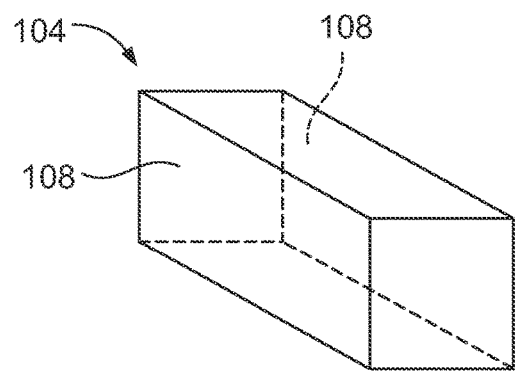
FIG. 3A is a perspective view of an example of a battery cell array of the traction battery of FIG. 2.
Figure 3B:
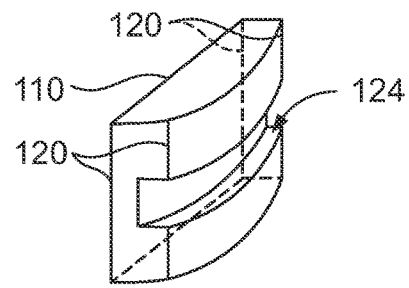
FIG. 3B is a perspective view of an example of an endplate of the portion of the traction battery of FIG. 2.
Figure 3C:
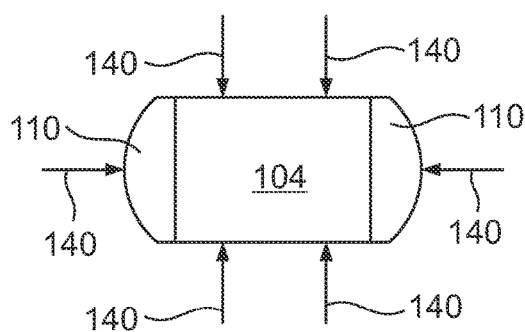
FIG. 3C is a plan view of the portion of the traction battery of FIG. 2.

FIG. 2 shows a portion of an example of a traction battery, referred to generally as traction battery 100 herein. It is contemplated that the traction battery 100 may be comprised of additional components not shown in the FIG. 2. The traction battery 100 may include a battery cell array 104 and a retention assembly. The battery cell array 104 may include a plurality of battery cells 106 and may define outer faces 108 as shown in FIG. 3A. In one example, the retention assembly may include a pair of endplates 110, a retention strap 112, and an attachment fitting 114. Each of the endplates 110 may define vertical edges 120 and a receiving groove 124 extending laterally therebetween as further shown in FIG. 3B. It is contemplated that other examples of configurations for the receiving groove 124 are available. For example, the endplates 110 may define partial cutouts (not shown) of the vertical edges 120. As another example, the endplates 110 may define lateral extrusions (not shown) spanning between the vertical edges 120 to define a groove for receiving the retention strap 112. The retention strap 112 may be sized to sit within the receiving groove 124 and may define a first end 130 and a second end 132. The retention strap 112 and the receiving grooves 124 may be arranged with one another such that the retention strap 112 wraps around the battery cell array 104 and the endplates 110 at a portion of the battery cell array 104 which is substantially a midpoint of a height of the battery cells 106.

The attachment fitting 114 may join the first end 130 and the second end 132 to one another such that compression forces are applied to the battery cell array 104 as illustrated with force arrows 140 show in 3C. The forces may be distributed uniformly, distributed non-uniformly, or concentrated local forces as shown with force arrows 140. For example, in an assembly process for battery cell arrays such as the battery cell array 104, the battery cells 106 may first be stacked with nonconductive spacers in between the battery cells 106. Compressing and binding of the battery cells 106 may assist in managing bulging of the battery cells 106 which may occur due to varying states of charge, temperatures, and an age of the battery cells 106. Further, compressing the battery cells 106 may provide a compact unit of battery cells 106 to simplify installation, shipping, and handling.

Figure 4:
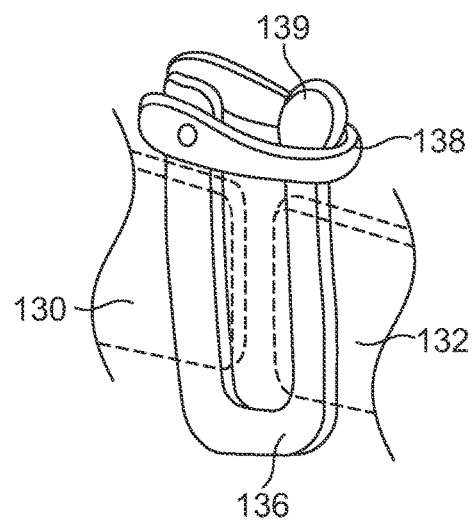
FIG. 4 is a perspective view of an attachment fitting for a retention assembly.

It is contemplated that the retention strap 112 may have various structural compositions. For example, the retention strap 112 may be a webbed strap made of polyester filament yarn woven into a single strap, similar to a composition of a seat belt. The attachment fitting 114 may have various designs to facilitate the joining of the first end 130 and the second end 132. For example, the attachment fitting 114 may include joinable male and female adapters secured to the first end 130 and the second end 132, similar to that of a seat belt buckle. In another example as shown in FIG. 4, the attachment fitting 114 may be a carabiner including a body 136 which may extend through loops of the first end 130 and the second end 132. A gate 138 may be pivotally secured to the body 136 and configured to rotate and engage a nose 139 of the body 136 to prevent the retention strap 112 from losing tension. The attachment fitting 114 may be made of an aluminum alloy if, for example, electrical isolation of the battery cell array 104 is achieved by means of other components adjacent thereto. The attachment fitting 114 may be configured to open and close multiple times. It is also contemplated other examples of the attachment fitting 114 may be permanently closed. Alternatively, the attachment fitting 114 may be made of an aluminum core over-molded with thermoplastics if, for example, the attachment fitting 114 is required to be non-conductive. Examples of thermoplastics which may be used with the aluminum core include polyetherketone, polyethersulfone, polyamide, or polyphenylene.

Figure 5A:
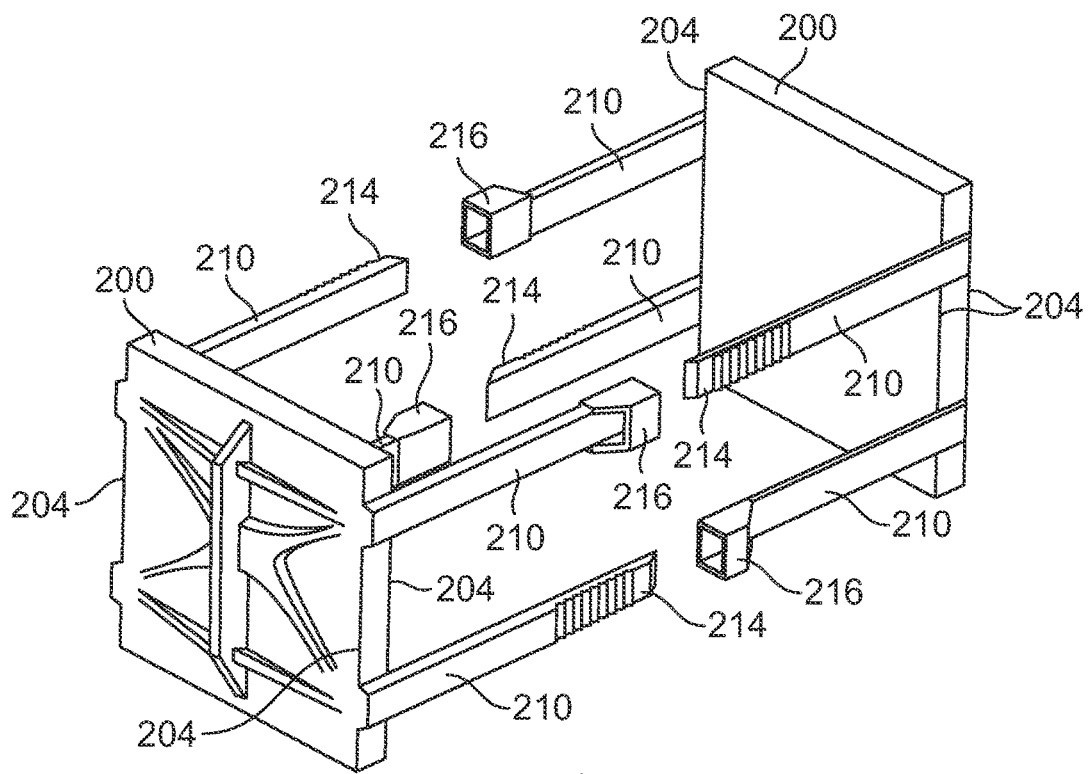
FIG. 5A is a perspective view of an example of endplates and a retention assembly.
Figure 5B:
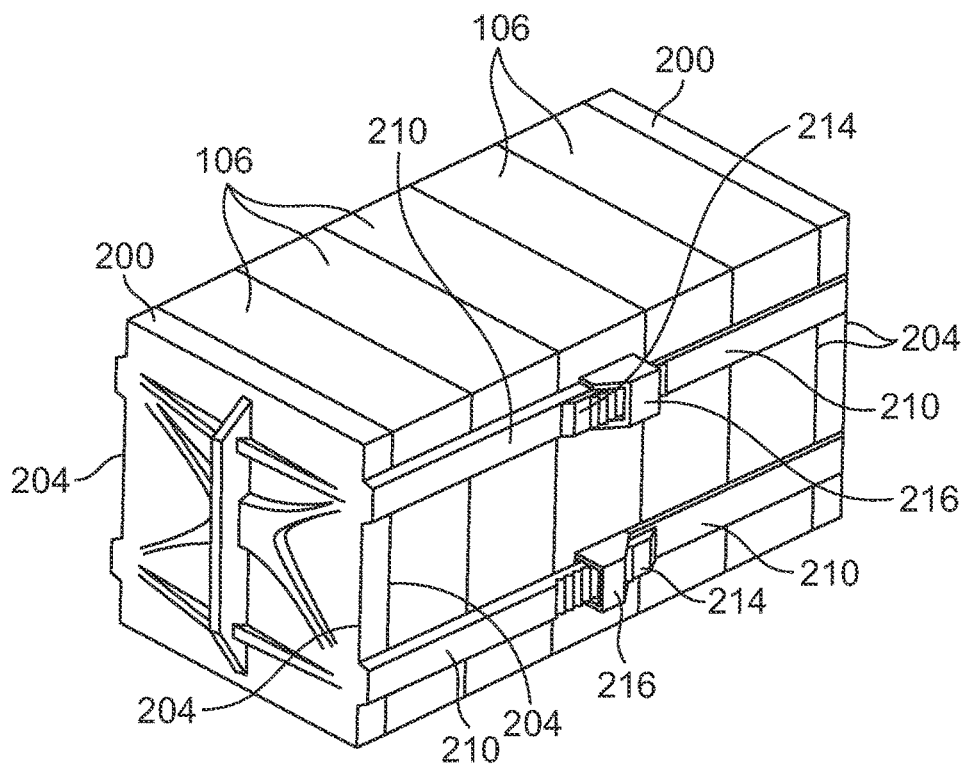
FIG. 5B is a perspective view of the endplates and retention assembly of FIG. 5A showing retention straps engaged with one another and a battery cell array retained therebetween.

FIGS. 5A and 5B show another example of a retention assembly to assist in retaining a battery cell array such as the battery cell array 104. The retention assembly in this example may include a pair of endplates 200. The endplates 200 may be spaced apart from one another to accommodate positioning of the battery cell array 104 therebetween. The endplates 200 may define vertical edges 204. One or more retention straps 210 may extend from the vertical edges 204. The one or more retention straps 210 may include another example of an attachment fitting, such as a combination of male connectors 214 and female connectors 216, to join the opposing retention straps 210. The male connectors 214 and the female connectors 216 may include a series of interlocking teeth to facilitate a mechanical attachment of the opposing retention straps 210 as shown in FIGS. 5A and 5B and similar to a zip tie strap. Under certain conditions, increasing a number of the interlocking teeth may increase an interlocking strength of the retention assembly and reduce a shear load on each individual tooth by distributing a total tensile load across the total quantity of teeth, thus allowing the retention assembly to withstand larger battery cell 106 bulging forces. The retention straps 210 may be symmetrical such that there are two endplates 200 to compress an array; however the two endplates 200 are the same component used twice. The male connectors 214 and the female connectors 216 may be placed at various positions along a length of the battery cell array 104 depending on packaging constraints and neighboring vehicle components.

While the retention straps 210 are shown integrated with the endplates 200 in FIGS. 5A and 5B, it is contemplated that the retention straps 210 may be individual units which are secured to the endplates 200 with various types of connectors (not shown). For example, the endplates 200 may include male connectors molded into corners of the endplates 200. A retention strap having two female ends may extend between the endplates 200 and mate with the male connectors of each endplate 200. This example may provide an opportunity to utilize common endplates in a system with multiple battery cell arrays having different lengths. Benefits may also be gained from a shipping perspective since the separate endplates and retention straps may support a greater shipping density. In another example, one of the endplates 200 may include female connectors molded into corners of the endplates 200 and the other of the endplates 200 may include a retention strap extending therefrom.

Multiple manufacturing and material options are available for the retention straps 210. For example, structural reaction injection molding (SRIM) may be used to create a dry, continuous fiber mesh or fiber mat (or preform) which may be placed in a closed mold and then two reacting liquids may be injected therein. The preform may then be impregnated into a resin matrix. Common resins used for SRIM include urethane, acrylamate, and dicyclopentadiene. In another example, various thermoplastic matrices may be injection molded with chopped glass or carbon fibers. Examples of suitable thermoplastic matrices include polypropylene, polyethylene, polybutylene terephthalate, polyamide 6, polyamide 6-6, polyetherimide, and polyphenylene. In contrast to a continuous, predetermined fiber orientation associated with SRIM, fibers in this example may be oriented along a direction of plastic flow during the injection molding process.

Figure 6:
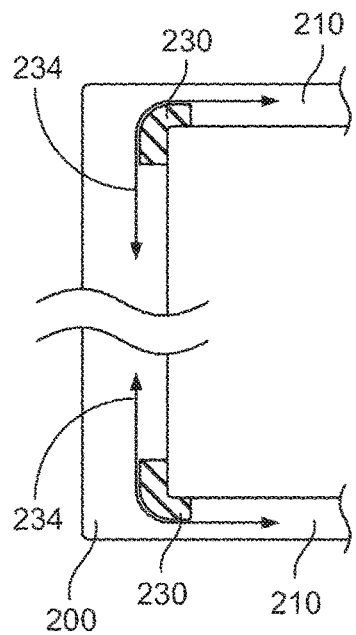
FIG. 6 is a plan view, in cross-section, of one of the endplates of FIG. 5A showing reinforcement inserts.

FIG. 6 shows an example of a highly stiff, ceramic or thermoset material insert 230 which may be molded into the endplate 200 having a thermoplastic matrix to assist in resisting highly loaded glass fiber mat or tape 234 from pulling through the softer thermoplastic matrix and transferring the resultant load to battery cells retained by the endplates 200.

Figure 7A:
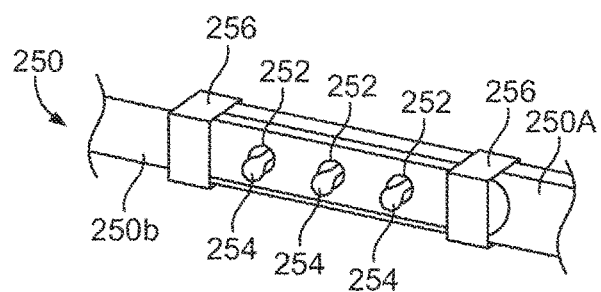
FIG. 7A is a perspective view of an example of an attachment fitting for a retention assembly for a traction battery.
Figure 7B:
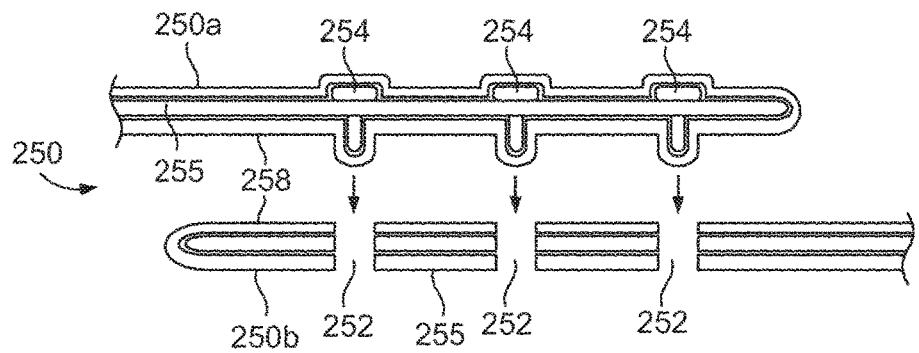
FIG. 7B is a side view, in cross-section, of the attachment fitting of FIG. 7A.

While FIGS. 5A and 5B show the retention straps 210 extending from each of the endplates 200, it is contemplated that other suitable strap configurations are available. For example, FIGS. 7A and 7B show a pair of retention straps 250 including a male strap 250a and a female strap 250b. The pair of retention straps 250 may also be referred to as baseball cap straps herein. The retention straps 250 may be a preform created by first suspending connectors 254, which may be metal studs in one example, in a continuous fiber mat or unidirectional tape 255. A plastic resin 258 may then impregnate the preform via injection molding, SRIM, or insert molding as illustrated in a cross-sectional view of the retention straps 250 in FIG. 7B. As another example of an attachment fitting, the female strap 250b may define apertures 252 to receive the connectors 254 extending from the male strap 250a to facilitate engagement of the retention straps 250 to one another. Clips 256 may be secured to the retention straps 250 on either side of the apertures 252 and connectors 254 to assist in preventing disengagement. Over molding may be utilized for manufacturing in this example. With over molding, the preform (the connectors 254 and the continuous fiber map or unidirectional tape 255) may be placed in the mold and subsequently over molded by the plastic resin 258.

Figure 8:
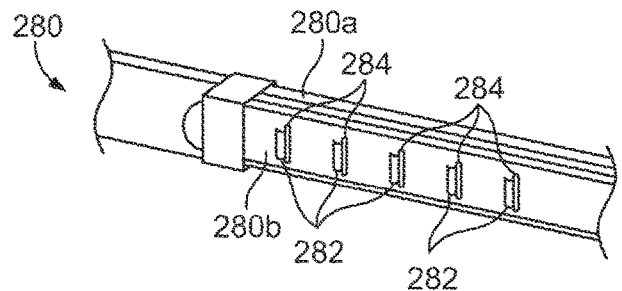
FIG. 8 is a perspective view of another example of an attachment fitting for a retention assembly for a traction battery.

FIG. 8 shows a pair of retention straps 280 including a male strap 280a and a female strap 280b. In yet another example of an attachment fitting, the male strap 280a may include hooks 282 for insertion into slots 284 defined by the female strap 280b. The hooks 282 may be suspended in a fibrous reinforcement molded in throughout the male strap 280a. To manufacture, a fibrous preform may be prepared first, such as diagonal plies comprised of strands of fibrous cords (not shown) or fibrous reinforcements in a rubber hose (not shown). Compounded and extruded Pre-cut strips of rubber may be added onto the preform via a calendaring process, and then cured in a closed mold.

Figure 9:
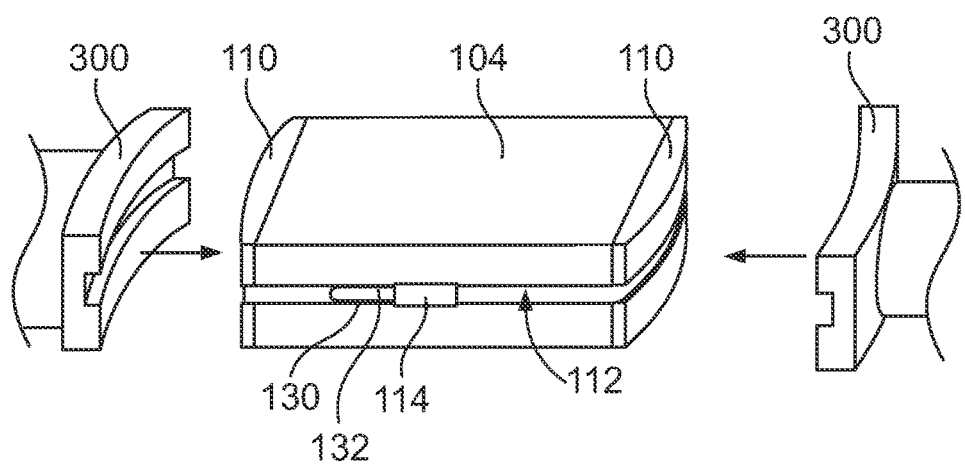
FIG. 9 is a perspective view of an example of a portion of a compression operation for a traction battery.
Figure 10A:
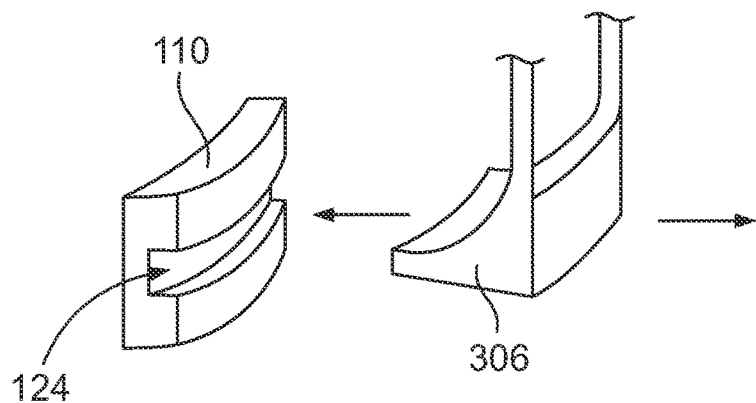
FIGS. 10A and 10B are perspective views of an example of portions of a lift operation for a traction battery.
Figure 10B:
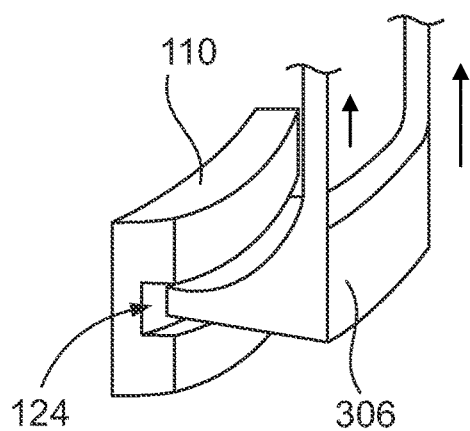

FIGS. 9 through 10B show examples of a compression operation and a lift operation using the endplates 110, the retention strap 112, the attachment fitting 114, and the battery cell array 104. It is contemplated that the other examples of retention straps, attachment fittings, and endplates described above may also be compressed and lifted in the manner shown in FIGS. 9 through 10B. The engagement or joining of the first end 130 and the second end 132 of the retention strap 112 may occur as a result of a compressive load exerted by a pair of compression tools 300 or by a secondary connecting operation (depending on the type of retention connector) executed while the battery cell array 104 is under compression. Once the retention strap 112 is engaged, one or more lifting tools 306 may grip the endplates 110 via the receiving groove 124 and subsequently move the traction battery 100 to a desired location. By using one of the examples of attachment fittings and straps described herein, male and female connectors thereof may self-engage when forces are applied to endplates, such as when the compression tools 300 exert a compressive load against the endplates 110.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A traction battery assembly comprising:
   an array of battery cells;
   a pair of endplates each disposed on opposite ends of the array and defining edges and a receiving groove extending between the edges;
   a strap sized to sit within the groove, and wrap around the array and endplates; and
   an aluminum alloy or aluminum core over-molded with a thermoplastic material attachment fitting to connect ends of the strap such that the endplates compress the cells.

2. The assembly of claim 1, wherein each of the ends of the strap define a loop, and wherein the attachment fitting comprises a carabiner including a body configured to extend through both loops to distal ends and a gate pivotally secured to one of the distal ends and configured to engage the other of the distal ends.

3. The assembly of claim 1, wherein the strap is of a nonconductive material to electrically isolate the battery cells.

4. The assembly of claim 1, wherein the receiving groove is sized to receive at least a portion of a lift tool.

5. The assembly of claim 1, wherein the strap is a polyester filament yarn woven into a single component.

6. The assembly of claim 1, wherein the endplates each further define the receiving groove at a mid-region of the endplates such that the strap wraps around the array at a substantially middle portion of outer faces defined by the array, and wherein the strap is of a material having a tensile load capability in excess of a predetermined expansion load of the cells.

7. The assembly of claim 1, wherein the attachment fitting and ends of the strap are arranged with one another such that the fitting and ends self-engage and apply a tension to the strap when opposing compression loads are applied to the endplates.

8. An electrified vehicle comprising:
an electric machine;
an array of battery cells configured to power the electric machine; and
a battery retention assembly including
a strap with first and second ends, wherein each of the ends of the strap defines a loop,
a pair of endplates disposed on opposite ends of the cells, each of the endplates defining a groove to receive a portion of the strap and to orient the portions such that the strap wraps around the array and endplates at a middle of the cells, and
an attachment fitting to secure the first and second ends to one another such that the assembly applies a compression force to the cells and endplates, wherein the attachment fitting comprises a carabiner including a body configured to extend through both loops to distal ends and a gate pivotally secured to one of the distal ends to engage the other of the distal ends.

9. The vehicle of claim 8, wherein the attachment fitting and first and second ends are arranged with one another such that the fitting and ends self-engage and apply a tension to the strap when opposing compression loads are applied to the endplates.

10. The vehicle of claim 8, wherein at least one of the ends includes connectors coated with a plastic resin via injection molding, structural reaction injection molding, or insert molding.

11. The vehicle of claim 8, wherein the receiving groove is sized to receive at least a portion of a lift tool.

12. A retention assembly for a vehicle traction battery comprising:
first and second endplates spaced apart and each defining edges on both sides of an endplate face;
a first pair of opposing baseball cap straps defining distal ends and extending toward one another from the first and second endplates; and
a second pair of opposing baseball cap straps defining distal ends and extending toward one another from the first and second endplates, wherein the distal ends include a male or female connector configured to self-engage with the other connector of the pair when compression forces are applied to the endplates.

13. The assembly of claim 12, wherein the endplates further comprise female connectors integrated therewith, and wherein the pairs of opposing baseball cap straps are configured to mate with the female connectors at portions of the straps opposite the distal ends.

14. The assembly of claim 12, wherein the pairs of opposing baseball cap straps are integrated with the endplates.

15. The assembly of claim 12, wherein each of the endplates further comprises ceramic or thermoset inserts disposed therein to reinforce portions of the endplates configured to receive loads from the first and second pairs of opposing baseball cap straps.

16. The assembly of claim 12, wherein the pairs of opposing baseball cap straps are of a non-conductive material to electrically isolate the battery cells.

17. The assembly of claim 12, wherein the male connector is a hook and the female connector has an aperture sized to receive the hook.

* * * * *